| (12) United States Patent | (10) Patent No.: US 7,445,707 B2 |
|---|---|
| Menke et al. | (45) Date of Patent: Nov. 4, 2008 |

(54) WASTE EFFLUENT TREATMENT SYSTEM

(75) Inventors: Thomas Menke, Greenville, OH (US); David Ricke, Greensburg, OH (US)

(73) Assignee: Envirolytic Technologies, LLC, Greenville, OH (US)

( * ) Notice: Subject to any disclaimer, the term of this patent is extended or adjusted under 35 U.S.C. 154(b) by 188 days.

(21) Appl. No.: 10/908,428

(22) Filed: May 11, 2005

(65) Prior Publication Data

US 2006/0065595 A1    Mar. 30, 2006

(51) Int. Cl.
C02F 3/00 (2006.01)
(52) U.S. Cl. .................... 210/194; 210/195.3; 210/513; 210/532.1
(58) Field of Classification Search ................. 210/194, 210/195.3, 513, 532.1
See application file for complete search history.

(56) References Cited

U.S. PATENT DOCUMENTS

| 3,950,562 A | 4/1976 | Senior |
| 3,956,126 A | 5/1976 | Streebin et al. |
| 4,018,899 A | 4/1977 | Seckler et al. |
| 4,250,023 A | 2/1981 | Samis et al. |
| 4,338,337 A | 7/1982 | Frankl |
| 4,369,194 A | 1/1983 | Arosvic |
| 4,391,623 A | 7/1983 | Knepper |
| 4,721,569 A | 1/1988 | Northrop |
| 5,015,421 A | 5/1991 | Messner |
| 5,078,882 A | 1/1992 | Northrop |
| 5,472,472 A | 12/1995 | Northrop |
| 5,538,529 A | 7/1996 | Northrop |
| 5,593,600 A | 1/1997 | Solomon |
| 5,626,644 A | 5/1997 | Northrop |
| 5,628,912 A | 5/1997 | Nesseth |
| 5,639,371 A | 6/1997 | Loy et al. |
| 5,755,852 A | 5/1998 | Northrop |
| 5,811,011 A | 9/1998 | Ciszczon et al. |
| 5,853,585 A | 12/1998 | Nesseth |
| 5,906,774 A | 5/1999 | Loy |
| 5,950,839 A | 9/1999 | Wedel |
| 5,957,301 A | 9/1999 | Wedel et al. |
| 6,007,720 A | 12/1999 | Tomita |
| 6,039,874 A | 3/2000 | Teran et al. |

(Continued)

OTHER PUBLICATIONS

Tru-Grit Manure Sand Saver, Parkson Corporation, 2006, pp. 1-2.

(Continued)

*Primary Examiner*—Chester T Barry
(74) *Attorney, Agent, or Firm*—Dinsmore & Shohl LLP

(57) ABSTRACT

A waste treatment system that removes as much of the inorganic and organic solids as possible prior to treating the collected waste material in treatment lagoons. First, inorganic solids, such as sand, are removed, if needed. Then coarse solids are removed, including manure and other organic material such as straw. After removal of inorganic and coarse solids, additional fine solids are removed through two settling basins. For example, after coarse solids separation and fine solids separation, the solids concentration has been reduced by over 80%. Preferably, the coarse solids separation and fine solids separation has reduced size requirements of the treatment lagoons to accommodate an organic loading, as total volatile solids, between 0.00253 lb/ft$^3$ of lagoon volume/day×K and 0.0105 lb/ft$^3$ of lagoon volume/day×K, where K varies from about 0.4 to about 1.2. Finally, the remaining liquid is treated in the treatment lagoons.

23 Claims, 4 Drawing Sheets

U.S. PATENT DOCUMENTS

| | | | |
|---|---|---|---|
| 6,054,044 A * | 4/2000 | Hoffland et al. | 210/96.1 |
| 6,071,418 A | 6/2000 | Tai | |
| 6,082,548 A | 7/2000 | Stephenson et al. | |
| 6,103,123 A | 8/2000 | Gantzer | |
| 6,190,566 B1 * | 2/2001 | Kolber | 210/744 |
| 6,193,889 B1 | 2/2001 | Teran et al. | |
| 6,227,379 B1 | 5/2001 | Nesseth | |
| 6,234,323 B1 | 5/2001 | Sarrouh | |
| 6,254,775 B1 | 7/2001 | McElvaney | |
| 6,299,774 B1 | 10/2001 | Ainsworth et al. | |
| 6,346,240 B1 | 2/2002 | Moore, Jr. | |
| 6,368,508 B1 | 4/2002 | Gatz et al. | |
| 6,368,849 B1 | 4/2002 | Norddahl | |
| 6,372,146 B1 | 4/2002 | Verdegaal et al. | |
| 6,398,959 B1 | 6/2002 | Teran et al. | |
| 6,426,005 B1 | 7/2002 | Larsson | |
| 6,470,828 B1 | 10/2002 | Townsend et al. | |
| 6,517,714 B2 | 2/2003 | Streat | |
| 6,531,057 B1 | 3/2003 | Houle | |
| 6,569,332 B2 | 5/2003 | Ainsworth et al. | |
| 6,663,782 B2 | 12/2003 | Morse et al. | |
| 6,689,274 B1 | 2/2004 | Northrop et al. | |
| 6,689,277 B2 | 2/2004 | Streat | |
| 6,773,594 B1 | 8/2004 | van der Wijngaart | |
| 6,773,595 B2 | 8/2004 | Gantzer | |
| 6,783,677 B1 | 8/2004 | Irani | |
| 6,811,701 B2 | 11/2004 | Wilkie | |
| 6,860,997 B1 | 3/2005 | Frederick et al. | |
| 6,863,181 B2 | 3/2005 | Dias | |
| 2002/0030012 A1 | 3/2002 | Sullivan et al. | |
| 2002/0056690 A1 | 5/2002 | Wegner | |
| 2002/0079266 A1 | 6/2002 | Ainsworth et al. | |
| 2002/0121486 A1 | 9/2002 | Verdegaal et al. | |
| 2003/0075501 A1 | 4/2003 | Wilkie | |
| 2004/0011734 A1 | 1/2004 | Cha et al. | |
| 2004/0050777 A1 | 3/2004 | Khan | |
| 2004/0065611 A1 | 4/2004 | Jones | |
| 2004/0079698 A1 | 4/2004 | Northrop et al. | |
| 2004/0154982 A1 | 8/2004 | Irani | |
| 2004/0154988 A1 | 8/2004 | Sheets, Sr. | |
| 2004/0159608 A1 * | 8/2004 | Hoffland | 210/620 |
| 2005/0000906 A1 | 1/2005 | Blais et al. | |
| 2005/0167359 A1 | 8/2005 | Wilkie | |
| 2005/0242025 A1 | 11/2005 | Stock | |

OTHER PUBLICATIONS

James C. Baker, "Lagoon Design and Management for Livestock Waste Treatment and Storage," Water Quality & Waste Management, North Carolina Cooperative Extension Service, No. EBAE 103-83, (Mar. 1996).

Bion, "various pages from http://www.biontech.com/technology/index.html," Bion Environmental Technologies, Inc.

Norweco.com, "Identification of Wastewater Organisms," http://www.norweco.com/html/lab/Identify.htm.

Linvil G. Rich, "Aerated Lagoon Technology," Clemson University Environmental Engineering & Science, http://www.ces.clemson.edu/ees/rich/technotes/.

Linvil G. Rich, "Effluent BOD5—A Misleading Parameter for the Performance of Aerated Lagoons Treating Municipal Wastewaters," Aerated Lagoon Technology, Technical Note No. 1, Clemson University Environmental Engineering & Science, http://www.ces.clemson.edu/ees/rich/technote1.html.

Linvil G. Rich, "Facultative Lagoons: A Different Technology," Aerated Lagoon Technology, Technical Note No. 8, Clemson University Environmental Engineering & Science, http://www.ces.clemson.edu/ees/rich/technotes/technote8.htm.

Farm Pilot Project Coordination, Inc., "Technologies for Nutrient Management, Dairy Projects," http://fppcinc.org/dairy.htm.

* cited by examiner

WASTE EFFLUENT TREATMENT SYSTEM

BACKGROUND OF THE INVENTION

This invention relates generally to waste effluent treatment systems and processes and more particularly to a waste effluent treatment system and process for agricultural animal waste.

Over the past decades, there has been a shift from smaller localized family farms toward larger integrated confinement agricultural operations. Specifically, large agricultural operations may utilize confinement barns to house a large number of livestock such as swine, poultry or dairy cows. The dairy industry operates using large farms that house thousands of animals in a relatively small land area. While these larger agricultural operations have numerous advantages, attendant with these larger facilities are potential pollution problems relating to the handling and treatment of manure and wastewater. By way of example, pollution problems associated with liquid animal waste include nitrogen, phosphorus, solids, bacteria and foul odors that result from anaerobic storage of liquid manures. Environmental concerns more specifically center on odor and water quality issues.

It is well known that the storage and treatment of manure and management of manure in confined animal feeding operations, such as those used for dairy, poultry and swine, is one of the most difficult, expensive and potentially limiting problems facing the agricultural industry today. Animal excrement, in the form of manure, contains high amounts of nitrogen, phosphorous and other chemical constituents such as salts, which derives from the undigested portion of animal feed, that make such manure undesirable for contact with fresh water sources, such as rivers and underground aquifers, and difficult to treat or remove once it contaminates fresh water. As a result, manure management is an important task for every confined animal feeding operation and can require a significant amount of resources, including labor, land, equipment and financial resources.

Farmers often create storage lagoons or basins on their farms to accumulate and store the flushed wastewater, feces and urine until an appropriate time to distribute the wastes over the land. The wastewater can be utilized as flush water not only to reduce the amount of water consumed by the animal production, but also to conserve the capacity of the lagoon. Using the lagoon water for flushing reduces the water consumption by 70-90% and proportionally reduces the required size of the lagoon. The wastewater is usually stored until crop harvest and applied to cropland in place of a commercial fertilizer prior to the next crop.

Typically, during the storage process, due to the large volume of animal waste entering the lagoon, there is insufficient oxygen present to support the growth of aerobic cultures and/or aerobic biological activity. In the absence of the desired oxygen and highly concentrated manure constituents, the microbial growth in the lagoon converts to anaerobic activity. This anaerobic activity leads to what is commonly known as a "septic" lagoon. In a septic lagoon, a very foul odor is present from the production of hydrogen sulfide, organic-sulfide compounds, organic acids, etc. When the accumulated waste liquid is distributed over the cropland by spray irrigation, the foul smelling volatile gases are liberated, producing a very undesirable environment.

Aeration equipment can be installed to provide sufficient dissolved oxygen to maintain an aerobic culture. However, the energy cost and mechanical maintenance expenses as well as equipment costs to operate the aerobic treatment can be cost prohibitive. There are several methods of aeration available. Surface aerators are commonly used in large open areas. The surface aerator consists of an electric motor driven impeller suspended in the throat of a venturi with the entire unit mounted on a float to suspend the impeller just below the surface. As the impeller spins, it pumps the water up forming a large circular spray. Oxygen is dissolved in the water as it falls through the air. The amount of water spray and subsequently the amount of oxygen dissolved is directly proportioned to the amount of water pumped and therefore the horsepower of the motor and energy consumed.

The foul odors of wastewater become apparent in most operations, including, but not limited to:

(1) When the stored water is returned to the barns as flush water, odors are liberated;

(2) Spray operations: when the wastewater is applied to the cropland by spray irrigation (most common method), the liquid is pumped under high pressure through a nozzle and sprayed over large area. The spray area as well as all areas downwind has a putrid odor and is very undesirable; and (3) Winter thermal changeover: In the winter to spring of the year, the normal thermocline of the lagoon is disturbed. Due to the temperature differences, the bottom layers roll to the surface, creating an extra heavy liberation of noxious odors. Another disadvantage of the temperature change and decreased temperature in the lagoon causes a decrease in the metabolic rate of the bacteria which are using the organic portion of the stored manure as food nutrients as energy.

Over the past few decades, more people have found it desirable to live in a country atmosphere rather than the conventional city life, resulting in a greater number of people living near agricultural centers. The foul odor coming from the storage basins and lagoons and spray fields has increasingly become a major environmental issue. For example, in 1997, the state of North Carolina passed a moratorium prohibiting the creation of any new anaerobic lagoons. New rules are being considered to phase out the use of all anaerobic lagoons because of the environmental and social problems.

A conventional prior art waste treatment system is shown in FIG. 1. The treatment system includes a confinement structure or barn 112, having waste slurry pits 114. Fresh water is piped in through fresh water inlet 116, mixes with recycled lagoon water or recycled manure wastewater 134 and washes through the barn 112 to slurry pits 114. The result is a waste slurry, typically having 2-3% total solids. The waste slurry is then directed through piping 118 into a lagoon 120.

A typical 8000 head grow/finish swine farm requires a 2-5 acre lagoon, dependent on regional climate, use or disposal of treated waste, seasonal storage requirements, and demands of regulatory permits. Water is then removed from lagoon 120 by pump 126 to be recycled by piping 128, 134 back to the barn 112 through inlet 136 for further waste removal. Additionally, the diluted slurry may be diverted through piping 130 for land application 132.

The foregoing illustrates limitations known to exist in present agricultural animal waste treatment systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a system for treatment of agricultural animal waste comprising:

a solids separator; and a digesting and fine solids separator system receiving liquid from the solids separator, the liquid being received from the solids separator having an organic loading of 0.00253 lb/ft$^3$ of lagoon volume/day×K to 0.0105 lb/ft$^3$ of lagoon volume/day×K, where K varies from about 0.4 to about 1.2.

In another aspect of the present invention, this is accomplished by providing a system for treatment of agricultural animal waste comprising:

means for separating the animal waste into a first solid component and a first liquid component;

means for separating the first liquid component into a first fine solid component and a second liquid component having an organic loading of 0.00253 lb/ft$^3$ of lagoon volume/day×K to 0.0105 lb/ft$^3$ of lagoon volume/day× K, where K varies from about 0.4 to about 1.2;

means for digesting organic material in the second liquid component and separating fine solids in the second liquid component into a third liquid component; and means for distributing the third liquid component to at least one of: an animal confinement facility; the environment; and, at least one of: crops and fields.

In a further aspect of the present invention, this is accomplished by providing a system for treatment of agricultural animal waste comprising:

a solids separator;

a primary settling basin receiving liquid from the solids separator;

a secondary settling basin receiving liquid from the primary settling basin;

a first facultative lagoon receiving liquid from the secondary settling basin;

a second facultative lagoon receiving liquid from the first facultative lagoon; and a liquid transfer system transferring liquid from the second facultative lagoon to at least one of: an animal containment facility; the environment;

and at least one of: crops and fields.

In yet another aspect of the present invention, this is accomplished by providing a system for treatment of agricultural animal waste comprising:

a settling lagoon receiving the animal waste;

a facultative lagoon receiving liquid from the settling lagoon; and a storage lagoon receiving liquid from the facultative lagoon.

In another aspect of the present invention, this is accomplished by providing a method for treatment of agricultural animal waste comprising the steps of:

providing a source of animal waste, the animal waste including solids and liquids;

separating solids from the animal waste;

digesting organic material from the animal waste after the step of separating solids from the animal waste, while further separating fine solids from the animal waste, producing treated liquid, the organic material having an organic loading of 0.00253 lb/ft$^3$ of lagoon volume/day×K to 0.0105 lb/ft$^3$ of lagoon volume/day×K, where K varies from about 0.4 to about 1.2; and after the step of digesting organic material, at least one of: recycling the treated liquid to an animal containment facility; discharging the treated liquid to the environment; and, applying the treated liquid to at least one of: crops and fields.

In a further aspect of the present invention, this is accomplished by providing a method for treatment of agricultural animal waste comprising the steps of:

collecting animal waste, the animal waste including solids and liquids;

temporarily storing the collected animal waste;

separating at least a portion of the solids from the collected animal waste;

storing the separated solids for a first predetermined period of time;

after the step of separating at least a portion of the solids from the collected animal waste, directing the collected animal waste to a primary settling basin;

directing any liquid from the stored separated solids to the primary settling basin;

holding the collected animal waste in the primary settling basin for a second predetermined period of time;

directing liquid from the primary settling basin to a secondary settling basin;

holding the liquid in the secondary settling basin for a third predetermined period of time;

directing liquid from the secondary settling basin to a first treatment lagoon;

holding the liquid in the first treatment lagoon for a fourth predetermined period of time;

directing liquid from the first treatment lagoon to a second treatment lagoon;

holding the liquid in the second treatment lagoon for a fifth predetermined period of time; and at least one of: recycling liquid from the second treatment lagoon to an animal containment facility; discharging liquid from the second treatment lagoon to the environment; and, applying liquid from the second treatment lagoon to at least one of: crops and fields.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
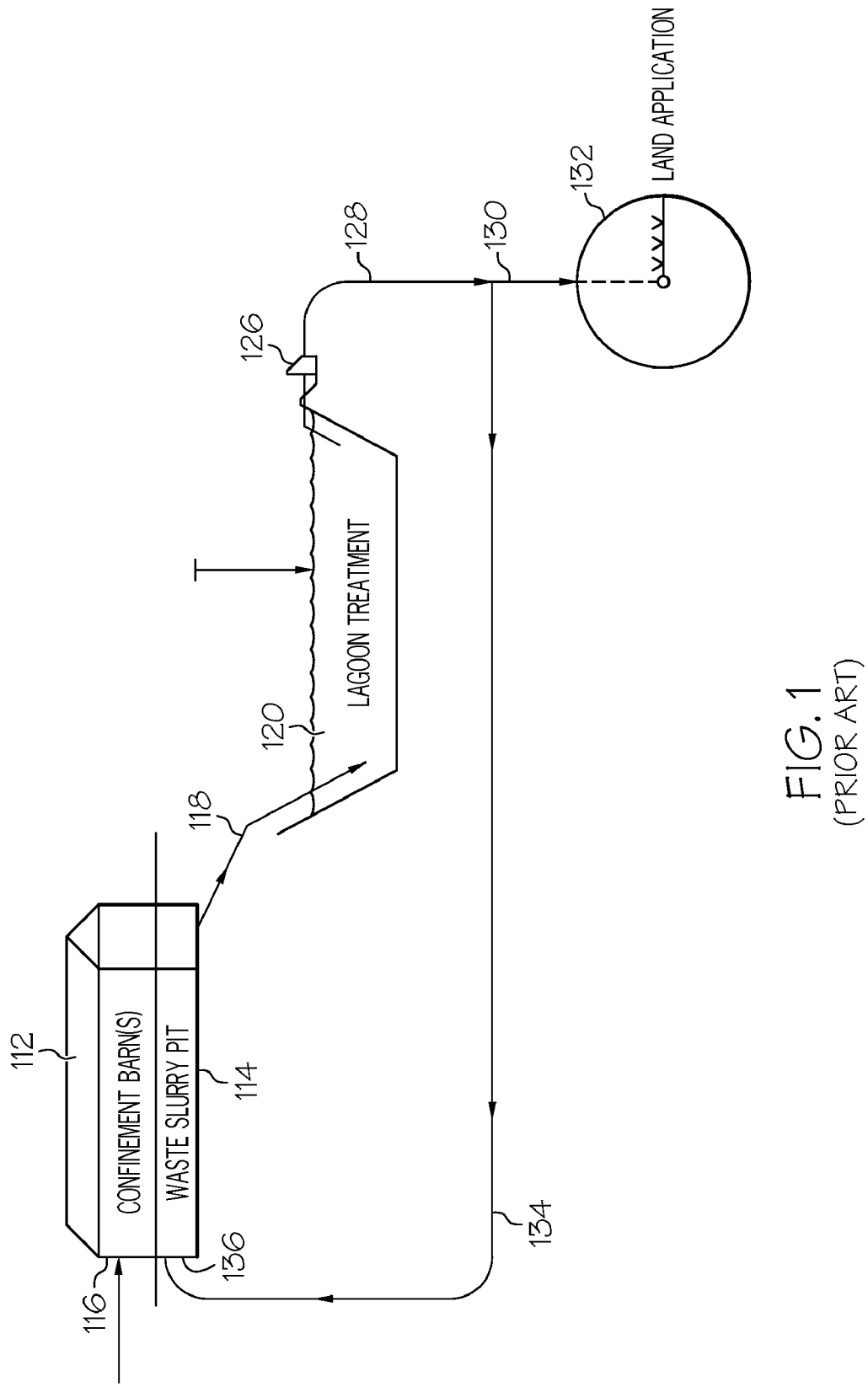
FIG. 1 is a schematic diagram of a prior art waste treatment system.
Figure 2:
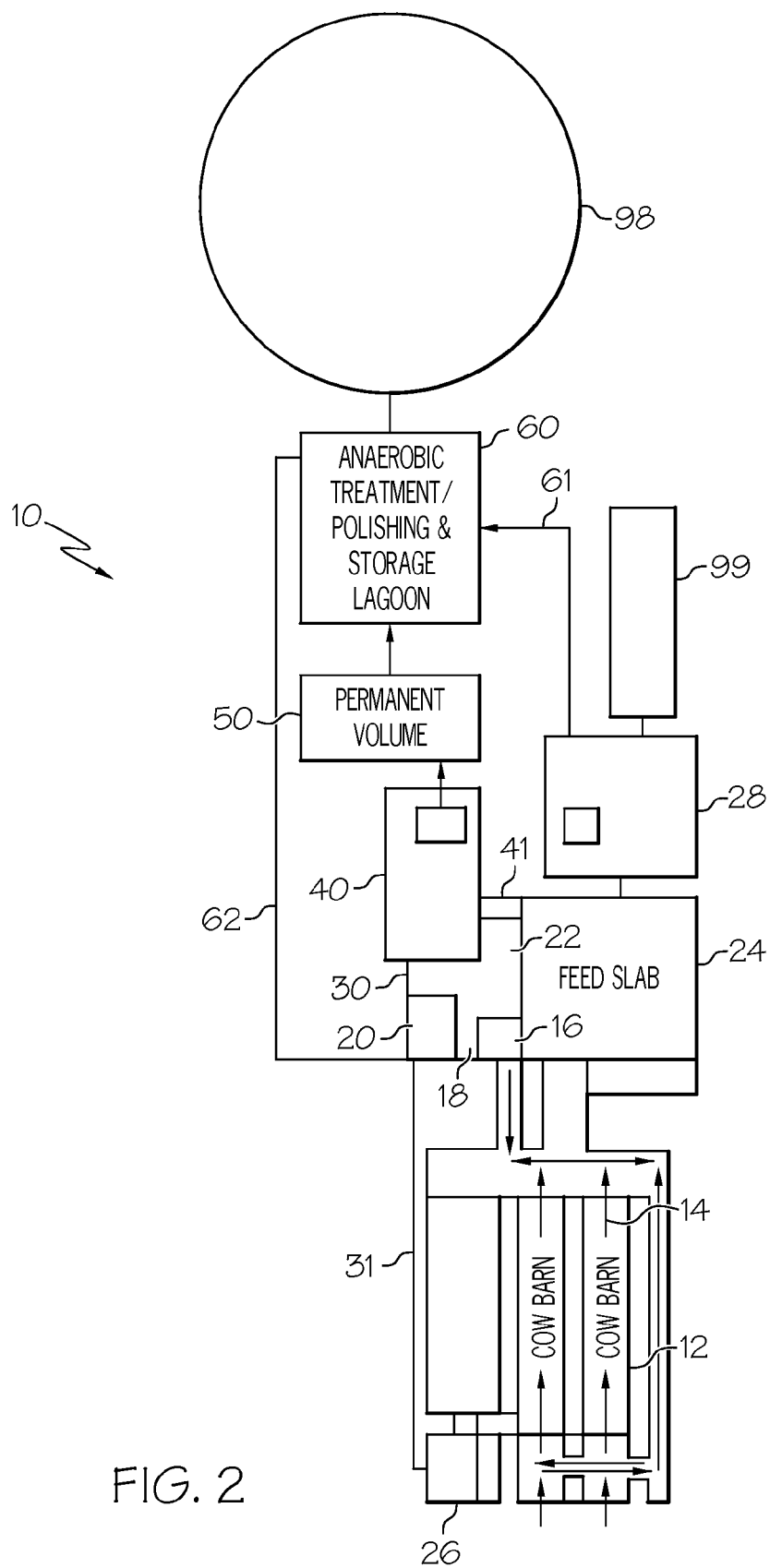
FIG. 2 is a schematic plan view of one embodiment of a waste treatment system according to the present invention.
Figure 3:
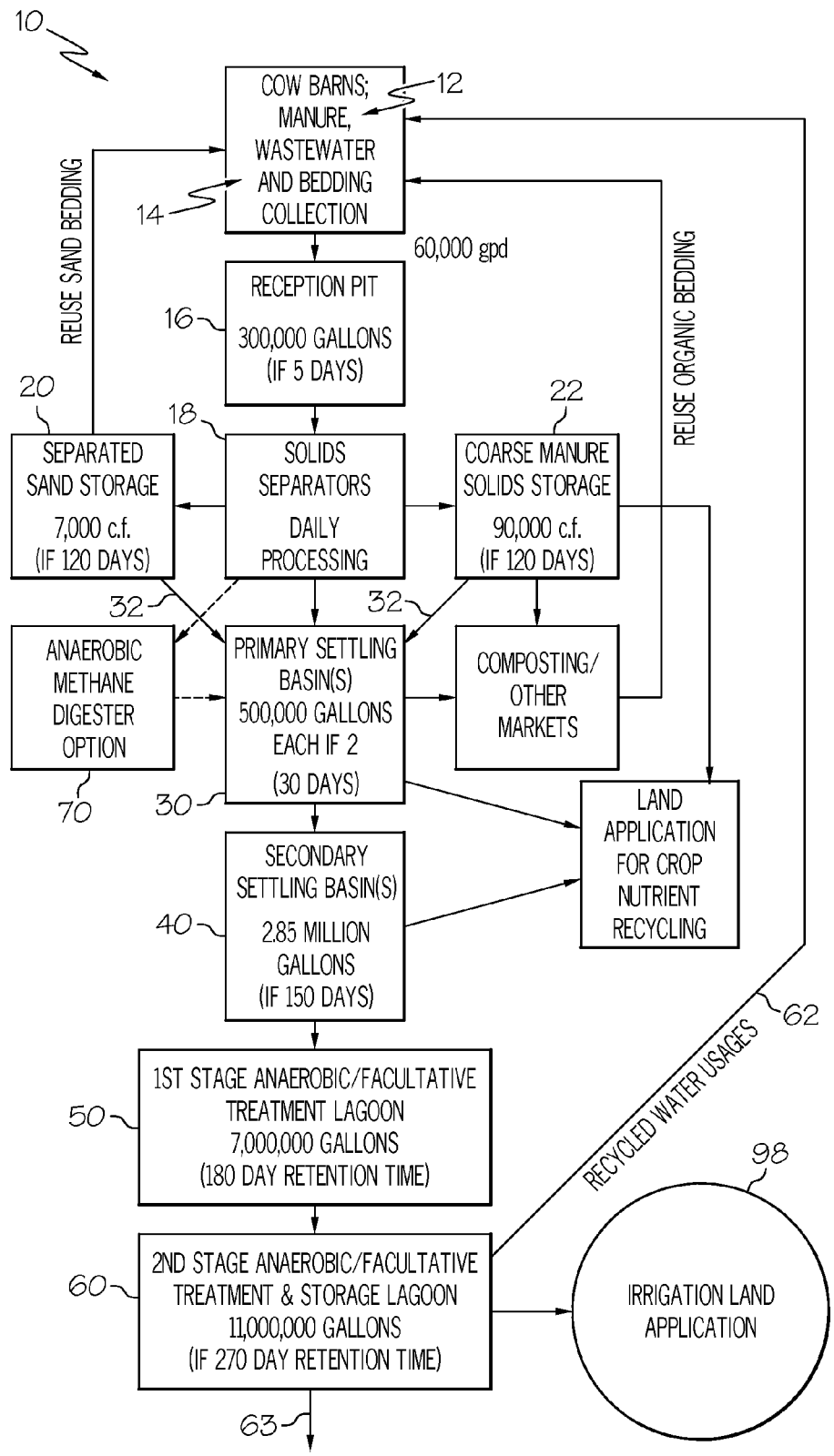
FIG. 3 is a second schematic representation of the waste treatment system shown in FIG. 2.
Figure 4:
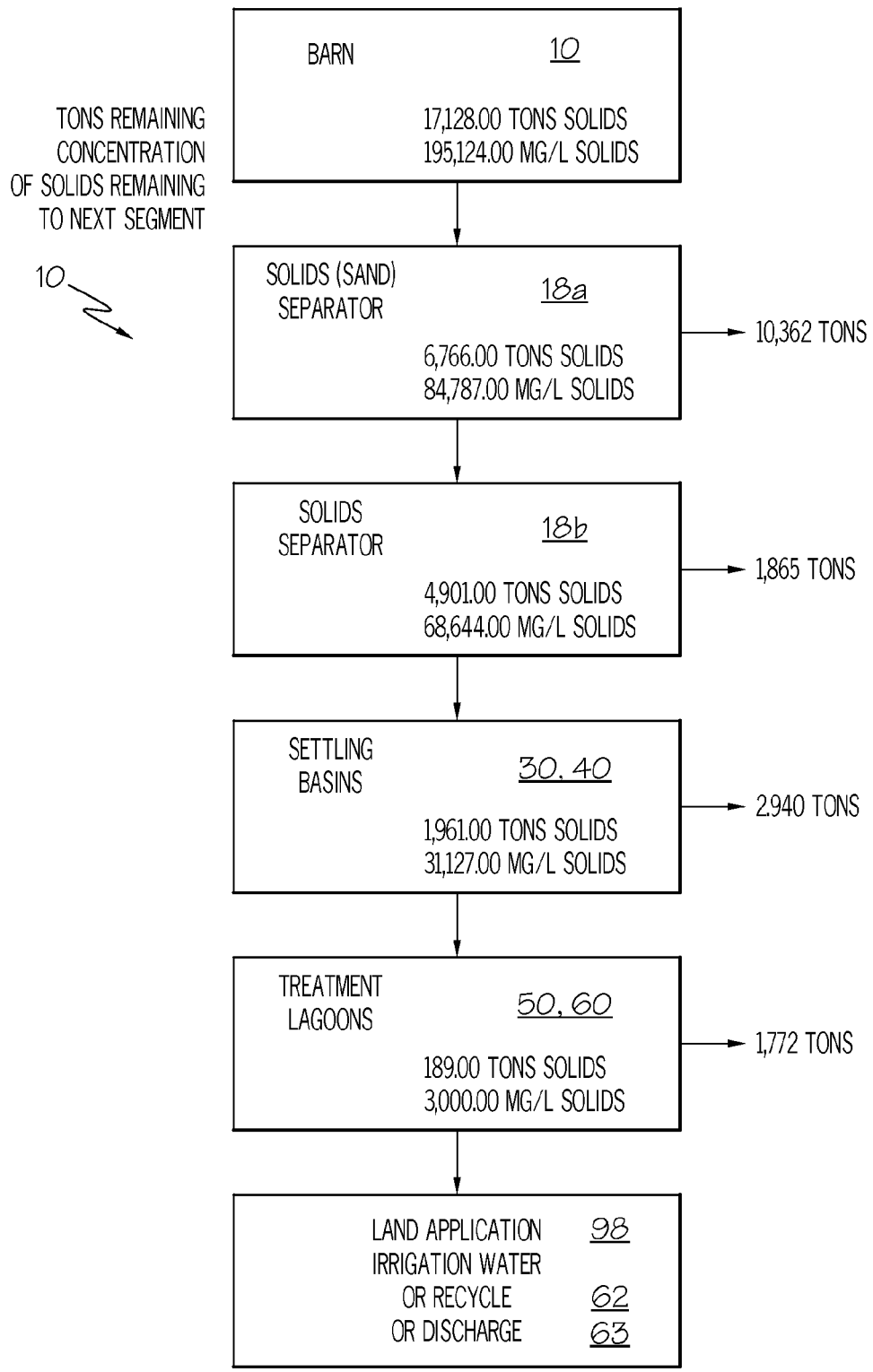
FIG. 4 is a general flow chart illustrating the quantity of solids and concentration of solids in the waste treatment system shown in FIG. 2.

FIGS. 2 through 4 illustrate a preferred embodiment of a waste treatment system 10. In general, the volumes, quantities and concentrations stated in the following description and the drawings are based on 2000 dairy cows located in a mid-western state. The cows are housed in a barn or animal containment facility 12 that contains bedding material, such as sand or straw. Manure and urine are deposited by the cows and get mixed with the bedding material, along with any dropped or spilled food.

Periodically, the mixed waste, containing manure, urine, spilled food, and bedding material, is collected or removed from the barn 12 and deposited in manure reception pit 16.

Typically, the mixed waste is collected three to four times a day. Various collection systems can be used, such as a vacuum tank, a scraper system or a flush system. The vacuum tank collection path 14 is shown in FIG. 2. Although a vacuum tank collection system is the preferred collection system, the waste treatment system 10 can use any waste collection system. In addition to any liquid already present in the manure and urine, the collected waste may contain additional liquids, such as washing water, flushing water, etc. Usually, the collected waste is about 90% to 95% liquid.

The manure reception pit 16 is intended for temporary storage of the collected waste material. Preferably, the collected waste material is processed at least daily, and, perhaps, even continuously. Since pit 16 is used for only temporary storage, it is sized to hold only a few days of collected waste material in order to provide sufficient volume in case of interruptions in downstream processing equipment. As shown in FIG. 3, a 2000 cow barn will typically produce about 60,000 gallons per day of collected waste material. This volume may be higher if a flush system is used to collect the waste material. Therefore, if a 5 day capacity is desired for the manure reception pit 16, the pit will have a 300,000 gallon capacity.

The various capacities described herein are illustrative or preferred capacities and may vary depending upon the climate where the cow barn 10 is located, the age of the animals, and may be different for other species, such as swine.

From the manure holding pit 16, the collected waste is transfer to a solids separator 18. Depending upon the type of bedding material used, the solids separator can include a sand separator 18a, which separates sand or other inorganic materials from the collected waste, or a coarse solids separator 18b, which separates manure, straw, sawdust, paper, hay and other organic materials from the collected waste. Usually, when both separators 18a, 18b are used, the collected waste will be processed by the sand separator 18a, and then by the coarse solids separator 18b. Liquids, i.e., the balance of the collected waste after removal of solids, are directed to a primary settling basin 30. Generally, mechanical separation equipment, such as a separator by McClanahan that uses the action of turbulent water, is used as the sand separator 18a. The coarse solids separator 18b is generally a mechanical separator, such as a screen separator, a screw press separator, etc. If additional liquid is needed for proper operation of a separator, such as a McClanahan separator, recycled water from the last step 60, a treatment lagoon, can be used in place of fresh water to reduce the volume of liquid being handled by the waste treatment system 10.

The separated sand from the sand separator 18a, along with some retained organic waste material and some retained liquids, is deposited in a separated sand storage area 20. Usually, the separated sand is held for a period of time to allow any retained liquids to drain off and to dry the separated sand. After the holding period, the sand can be reused as bedding material.

The separated coarse manure solids or organic material, along with some retained liquids, is deposited in a coarse manure solids storage 22. The separated coarse solids consist primarily of manure and organic bedding material. The coarse manure solids are held for a period of time to allow any retained liquids to drain off and to store until opportune times for further use. After the holding period, the coarse manure solids can be applied to fields or crops as a fertilizer or source of nutrients. Alternately, if the coarse manure solids includes materials with properties suitable for use as organic bedding material, it can be returned to the cow barn 10 for reuse as bedding material.

Liquids 32 from the separated sand storage 20 and the coarse manure solids storage 22 are captured and directed to the primary settling basin 30. Also, any wash water 31 from parlor 26 or other run-off 41 from feed slab 24 are captured and directed to the solids separator 18 or the primary settling basin 30, depending on the solids size and concentration. If the facility has a storm water pond 28, overflow 61 may be directed to the second stage treatment lagoon 60 for irrigation water. However, depending upon the water quality, the overflow can be directed to any other part of waste treatment system 10, as needed, for example, to maintain proper dilution of the treatment lagoons for proper efficient functioning. Alternatively, storm water overflow 61 can be directed to a natural or artificial wetlands 99.

Preferably, the primary settling basin 30 holds the waste for a thirty day period. This holding period can be longer or shorter depending upon many factors, including the animal species, regulatory requirements, solids concentration desired, organic loading, external environment, particle size distribution, etc. Primary settling basin 30 can be a single basin or multiple basins. For example, as shown in FIG. 3, in one embodiment, two 500,000 gallon basins are used. Either the single basin or the multiple basins can include weir walls, flow diverters, flow distributors, etc. to enhance the settling of solids in the basin. Periodically, settled solids are removed from primary settling basin 30. This can be accomplished by installed equipment, such as a loader that removes solids from the bottom of the basin, either mechanically or by using a suction device. Or, by diverting the incoming liquid to a second primary basin, or to partitioned area of the basin, and then removing the solids with mobile equipment, such as a front loader.

The primary purpose for primary settling basin 30 is for settling fine solids from the animal waste. In the event that regulations require a volume much greater than the volume needed for settling the fine solids, the basin 30 can be designed with multiple compartments such that one compartment can be used to facilitate settlement of solids and other compartment(s) provide the volume to meet the regulations for storage retention time. Such a design would confine the majority of the settled solids to a smaller area and facilitate removal of the solids.

Optionally, an anaerobic digester 70 can be used prior to the primary settling basin 30. The digester 70 can be used before the coarse solids separator 18b, or the digester 70 can be used after solids separation and prior to the primary settling basin 30. If the collected waste contains significant inorganic material, the inorganic material should be removed before the waste enters the digester 70. The anaerobic digester 70 removes solids from the waste by converting organic material to gases, such as methane. If the digester 70 is used before the coarse solids separator 18b, the size of the coarse solids separator can be reduced and gas production will be increased, which is advantageous if the methane gas is being captured to use as a fuel or fertilizer source. If the anaerobic digester 70 is used after the coarse solids separator 18b, then the size of the digester 70 can be reduced and the volume of separated solids increases, which is advantageous if the manure solids are being sold or used as fertilizer or a soil conditioner. In either case, the size of the primary settling basin 30 can be reduced because the quantity of solids entering the basin 30 has been reduced.

From the primary settling basin 30, overflow liquid with a reduced solids concentration flows to a secondary settling basin 40. For the 2000 cow system shown in the drawings, the secondary settling basin has a 2.85 million gallon capacity, which provides a 150 day holding time. In secondary settling basin 40, further settling of fine solids takes place. For example, after coarse solids separation and fine solids separation, the solids concentration has been reduced by over 80% for the system shown in the figures. Preferably, the organic loading, as total volatile solids (TVS), has been reduced to accommodate a smaller lagoon design that will be sized to treat between 0.00253 lb/ft$^3$ of lagoon volume/day×K TVS and 0.0105 lb/ft$^3$ of lagoon volume/day×K TVS. K is dependent on climatic conditions and animal species. For the United States and swine, dairy and poultry, K varies from about 0.4 to about 1.2.

In general, the settling basins and treatment lagoons are designed to hold a volume of: 1) accumulated solids or sludge, 2) a treatment volume, 3) runoff from collection areas, such as basin berm's, storage pads, etc., 4) normal precipitation, and 5) the 25 year 24 hour storm event, or larger, such as the 100 year 24 hour storm event. In current agricultural waste treatment lagoon systems, the accumulated sludge volume can be a significant portion of the total volume. In waste treatment system 10, the necessary accumulated sludge volumes are significantly reduced, allowing the basin or lagoon volume to be reduced, in comparison to current systems, as much as 50% or more.

From the secondary settling basin 40, the liquid flows into a first stage treatment lagoon 50. From the first stage treatment lagoon 50, the overflow liquid enters a second stage treatment and storage lagoon 60. Depending on a number of factors, such as animal species, type of organic bedding, the use of optional anaerobic digester 70, climate, use of a waste flushing system for waste collection, and other factors, either treatment lagoon could be an aerobic lagoon, an anaerobic lagoon, a combined aerobic/anaerobic lagoon or facultative lagoon. Preferably, both treatment lagoons 50, 60 rely on bacteria naturally present in the collected waste. Such bacteria could include hydrogen sulfide producing and consuming bacteria, methane producing and consuming bacteria, nitrogen to ammonia transforming bacteria, and ammonia to nitrate transforming bacteria. Typical sulfur consuming bacteria include *Thiocarpsa roseopersicina, Amoebobacter roseus, A. pendens*, and *A. pedioformis* species.

A facultative lagoon is one with characteristics that are typical of both aerobic and anaerobic lagoons. There may be enough dissolved oxygen in the upper few feet of relatively clear water to support aerobic decomposition. But, in darker areas near the bottom where no dissolved oxygen is available, the decomposition process is anaerobic. Facultative biological organisms can function in either aerobic or anaerobic zones of the lagoon.

In the preferred embodiment, shown in the figures, for a 2000 cow facility, the first stage treatment lagoon holds 7,000,000 gallons for a retention time of about 180 days. The second stage treatment and storage lagoon holds 11,000,000 for a 270 day retention time.

The overall processing time for the 2000 cow facility will be from about 451 to about 726 days.

After treatment, the treated water has the following properties:
 Nitrates—less than 10 mg/l
 BOD—less than 500 mg/l
 Total nitrogen—less than 320 mg/l
 Ammonia—less than 160 mg/l
 K—less than 2000 mg/l
 Phosphate—less than 100 mg/l
 Solids—less than 5000 mg/l.
Preferably, the treated water has the following properties:
 Nitrates—negligible
 BOD—150 to 300 mg/l
 Total nitrogen—less than 160 mg/l
 Ammonia—less than 80 mg/l
 K—less than 1190 mg/l
 Phosphate—less than 70 mg/l
 Solids—less than 3000 mg/l.
 Odorless From the second stage treatment lagoon 60, the treated water can be recycled 62 to the cow barn 12, discharged 63 to the environment, if meeting regulatory water quality requirements, or to the wetlands 99, or used for irrigation 98. Because of the reduced organic loading and reduction of other substances in the treated water, the treated water can be applied to growing crops. In some prior art systems, the organic loading and other substances can be so high that it can only be applied during the months subsequent to crop harvest and prior to crop planting.

As described above, the waste treatment system 10 operates by removing as much of the inorganic solids and organic solids as practicable prior to treating the collected waste material in treatment lagoons 50, 60. First, inorganic solids, such as sand, are removed, if needed. Then coarse solids are removed, including manure and other organic material such as straw. After removal of inorganic solids and coarse solids, additional fine solids are removed through the two settling basins 30, 40.

For example, after coarse solids separation and fine solids separation, the solids concentration has been reduced by over 80% for the system shown in the figures. Preferably, the coarse solids separation and fine solids separation has reduced the organic loading, as total volatile solids to accommodate a smaller lagoon design that will be sized to treat between 0.00253 lb/ft$^3$ of lagoon volume/day×K TVS and 0.0105 lb/ft$^3$ of lagoon volume/day×K TVS, where K varies from about 0.4 to about 1.2. Finally, the remaining liquid is treated in two facultative lagoons before being recycled as flush water or irrigation water. The reduction of the organic loading to the facultative lagoons allows the lagoon size to be reduced, improves the quality of the recycled water, and reduces odors released from the waste treatment system.

Generally, after the solids separator 18, waste treatment system 10 uses passive treatment of the waste that requires little or no operator intervention, other than periodic removal of accumulated solids, and no active equipment, such as aerators or mixers, except where necessary, pumps to transfer liquid from one stage to the next.

Although the representative waste treatment system 10 described above is for a 2000 cow dairy facility, the waste treatment system 10 can be used for other facilities, such as a beef feedlot, a poultry farm including egg processing or a swine confinement facility.

For example, a waste treatment system for a poultry egg processing facility could comprise a settling basin similar to the primary or secondary settling basins 30, 40, a treatment lagoon similar to treatment to the first stage or second stage treatment lagoons 50, 60 and a storage cell, which could be simply a holding cell or could also comprise an additional treatment lagoon. In particular, a poultry waste treatment system could be used for a poultry facility that included egg processing where the wash water provides most of the liquid processed by the waste treatment system.

A waste treatment system for swine could comprise a system very similar to the waste treatment system, except the coarse solids separator 18 is optional, depending upon the quantity of inorganic material and large organic material in the collected waste.

What is claimed is:

1. A system for treatment of agricultural animal waste comprising:
   a coarse solids separator configured to separate coarse solids from animal waste;
   at least one settling basin configured to receive and separate fine solids from liquid outputted from the coarse solids separator, and
   at least one treatment lagoon configured to receive and treat liquid outputted from the at least one settling basin, wherein the outputted liquid comprises an organic loading of 0.00253 lb of total volatile solids/ft$^3$ of lagoon volume/day×K to 0.0105 lb of total volatile solids/ft$^3$ of lagoon volume/day×K, where K varies from about 0.4 to about 1.2.

2. The system according to claim 1, wherein the treatment lagoon contains quantities of at least one of: anaerobic bacteria; and, aerobic bacteria.

3. The system according to claim 1 further comprising a fine solids separator disposed downstream of the coarse solids separator.

4. The system according to claim 3, further comprising:
   an anaerobic digester, the anaerobic digester being disposed upstream of the coarse solids separator, or disposed between the coarse solids separator and the at least one settling basin.

5. The system according to claim 3, wherein the coarse solids separator comprises an inorganic material separator and an organic material separator.

6. The system according to claim 1, wherein the treatment lagoon comprises at least one of: an anaerobic lagoon; an aerobic lagoon; and, a combined anaerobic/aerobic lagoon.

7. The system according to claim 1 wherein at least about 80% of the solids are removed from the animal waste after separation in the coarse solids separator and the at least one settling basin.

8. A system for treatment of agricultural animal waste comprising:
   means for separating the animal waste into a first solid component and a first liquid component;
   means for separating the first liquid component into a first fine solid component and a second liquid component, wherein at least about 80% of the solids are removed from the animal waste after separation of the first liquid component;
   means for digesting organic material in the second liquid component and separating fine solids in the second liquid component into a third liquid component; and
   means for distributing the third liquid component to at least one of: an animal confinement facility; the environment; and, at least one of: crops and fields.

9. The system according to claim 8, wherein the means for separating the animal waste into a first solid component and a first liquid component comprises:
   means for separating inorganic material from the animal waste; and
   means for separating organic material from the animal waste.

10. The system according to claim 8, wherein the means for separating the first liquid component into a first fine solid component and a second liquid component comprises:
    first means for settling solids out of the first liquid component; and
    second means for settling solids out of the first liquid component.

11. The system according to claim 8, wherein the means for digesting organic material in the second liquid component and separating fine solids in the second liquid component into a third liquid component comprises:
    first means for digesting organic material in the second liquid component and separating fine solids from the second liquid component; and
    second means for digesting organic material in the second liquid component and separating fine solids from the second liquid component.

12. The system according to claim 11, wherein the first means for digesting organic material in the second liquid component and separating fine solids from the second liquid component and the second means for digesting organic material in the second liquid component and separating fine solids from the second liquid component, each further comprise means for at least one of: anaerobically digesting organic material in the second liquid component; and, aerobically digesting organic material in the second liquid component.

13. A system for treatment of agricultural animal waste comprising:
    a coarse solids separator configured to separate coarse solids from the animal waste;
    at least one settling basin configured to receive and separate fine solids from liquid outputted from the coarse solids separator;
    a first facultative lagoon configured to receive and treat liquid from the at least one settling basin;
    a second facultative lagoon configured to receive and treat liquid from the first facultative lagoon; and
    a liquid transfer system transferring liquid from the second facultative lagoon to at least one of: an animal containment facility; the environment; and at least one of: crops and fields, or recycling liquid back to the system,
    wherein the liquid received into the first facultative lagoon from the at least one settling basin has an organic loading of 0.00253 lb of total volatile solids/ft$^3$ of lagoon volume/day×K to 0.0105 lb of total volatile solids/ft$^3$ of lagoon volume/day×K, where K varies from about 0.4 to about 1.2.

14. The system according to claim 13, wherein the first facultative lagoon and the second facultative lagoon each comprise at least one of: an anaerobic lagoon; an aerobic lagoon; and, a combined anaerobic/aerobic lagoon.

15. The system according to claim 13 further comprising:
    a sand separator disposed upstream of the coarse solids separator.

16. The system according to claim 13, further comprising:
    an anaerobic digester, the anaerobic digester being disposed upstream of the coarse solids separator, or disposed between the coarse solids separator; and the at least one settling basin.

17. The system according to claim 13, wherein liquid transferred from the second facultative lagoon has the following properties:
    Nitrates—less than 10 mg/l
    BOD—less than 500 mg/l
    Phosphate—less than 100 mg/l
    Solids—less than 5000 mg/l.

18. The system according to claim 13 wherein the at least one settling basin comprises:
    a primary settling basin receiving liquid from the coarse solids separator; and
    a secondary settling basin receiving liquid from the primary settling basin.

19. The system according to claim 13 wherein at least about 80% of the solids are removed from the animal waste after separation in the coarse solids separator and the at least one settling basin.

20. A system for treatment of agricultural animal waste comprising:
- a coarse solids separator configured to separate coarse solids from an animal waste feed;
- at least one settling basin configured to receive and separate fine solids from liquid outputted from the coarse solids separator;
- a facultative lagoon configured to receive liquid from the at least one settling basin; and
- a storage basin configured to receive liquid from the facultative lagoon, wherein the liquid received into the facultative lagoon from the at least one settling basin has an organic loading of 0.00253 lb of total volatile solids/$ft^3$ of lagoon volume/day×K to 0.0105 lb of total volatile solids/$ft^3$ of lagoon volume/day×K, where K varies from about 0.4 to about 1.2.

21. The system according to claim 20, wherein the storage basin is a facultative lagoon.

22. The system according to claim 20, wherein the animal waste comprises poultry, cattle or swine waste.

23. The system according to claim 20 wherein at least about 80% of the solids are removed from the animal waste after separation in the coarse solids separator and the at least one settling basin.

* * * * *